(12) United States Patent
Ries et al.

(10) Patent No.: US 11,345,384 B2
(45) Date of Patent: May 31, 2022

(54) STEERING WHEEL CONTROL SYSTEM

(71) Applicant: Caterpillar Paving Products Inc., Brooklyn Park, MN (US)

(72) Inventors: Michael William Ries, Andover, MN (US); Keith Daniel Koshiol, Ramsey, MN (US); Yasin Haji Mohamed, Savage, MN (US); Bryan Joseph Downing, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 6 days.

(21) Appl. No.: 16/856,314

(22) Filed: Apr. 23, 2020

(65) Prior Publication Data
US 2021/0331733 A1    Oct. 28, 2021

(51) Int. Cl.
*B62D 1/10* (2006.01)
*B62D 1/04* (2006.01)
*B62D 1/183* (2006.01)

(52) U.S. Cl.
CPC ............... *B62D 1/10* (2013.01); *B62D 1/046* (2013.01); *B62D 1/183* (2013.01)

(58) Field of Classification Search
CPC ........... B62D 1/10; B62D 1/183; B62D 1/046
USPC ........................................................ 280/775
See application file for complete search history.

(56) References Cited

U.S. PATENT DOCUMENTS

| | | | |
|---|---|---|---|
| 10,207,697 B2 | 2/2019 | Brown et al. | |
| 10,526,002 B2 | 1/2020 | Schwarz et al. | |
| 2006/0071464 A1* | 4/2006 | Priepke | B62D 1/10 |
| | | | 280/775 |
| 2016/0121918 A1* | 5/2016 | Soderlind | B62D 1/197 |
| | | | 74/493 |
| 2016/0375925 A1* | 12/2016 | Lubischer | B62D 6/00 |
| | | | 701/41 |
| 2017/0297606 A1* | 10/2017 | Kim | B62D 1/181 |
| 2018/0273081 A1* | 9/2018 | Lubischer | B62D 1/19 |
| 2019/0084609 A1* | 3/2019 | Rogers | B62D 1/187 |
| 2019/0106140 A1* | 4/2019 | Masu | B62D 1/12 |
| 2019/0152505 A1* | 5/2019 | Hansen | B60R 7/043 |
| 2019/0367072 A1 | 12/2019 | Hansen et al. | |
| 2020/0017077 A1* | 1/2020 | Petersen | E02F 9/2083 |

(Continued)

FOREIGN PATENT DOCUMENTS

| | | | | |
|---|---|---|---|---|
| CN | 106904213 A | * | 6/2017 | .......... B60R 21/205 |
| DE | 102019003711 A1 | * | 11/2020 | ............. B62D 1/183 |
| WO | 03020571 | | 3/2003 | |

*Primary Examiner* — Jonathan Ng
*Assistant Examiner* — Scott F. Underwood
(74) *Attorney, Agent, or Firm* — von Briesen & Roper, s.c.

(57) ABSTRACT

A steering wheel control system associated with a vehicle includes a steering wheel movable between a stowed position and a deployed position, wherein, in the deployed position, the steering wheel is centrally located relative to an operator of the machine. The steering wheel control system also includes a sensor assembly configured to generate a control signal pertaining to a position of the steering wheel. The steering wheel control system further includes a control module communicably coupled with the sensor assembly. The control module is configured to receive the control signal corresponding to the position of the steering wheel. The control module is also configured to control at least one operation of the vehicle based on receipt of the control signal from the sensor assembly.

17 Claims, 6 Drawing Sheets

(56) References Cited

U.S. PATENT DOCUMENTS

2020/0039562 A1* 2/2020 Patel ................. B62D 1/181
2020/0324814 A1* 10/2020 Riley ................. B62D 1/184
2021/0078625 A1* 3/2021 Yamazaki ............ B60W 10/20

* cited by examiner

STEERING WHEEL CONTROL SYSTEM

TECHNICAL FIELD

The present disclosure relates to a steering wheel associated with a vehicle, and more particularly to a steering wheel control system.

BACKGROUND

A vehicle, such as a passenger, commercial, or construction vehicle, typically includes a steering wheel. The steering wheel is associated with a steering system of the vehicle and allows steering of the vehicle during roading. In construction vehicles, the steering wheel may also be used for repositioning the vehicle during a work operation. Typically, the steering wheel is fixedly positioned within a driving cabin of the vehicle so that a user, such as a driver or vehicle operator, may handle the steering wheel to provide inputs to the steering system. In some vehicles, the steering wheel is located in the driving cabin such that the steering wheel may pose a challenge for users to move in and out of the driver cabin. Further, in some cases, the users may inadvertently actuate one or more controls related to the steering wheel while moving in or out of the vehicle, which is not desirable.

Some vehicles include a system having a steering wheel input device disposed at a side console on the operator seat. However, such existing systems require the entire side console to be lifted up for changing a position of the steering wheel input device, which in turn affects a positioning and functioning of controls on the side console. More particularly, a movement of the side console renders controls on the side console useless, which is not desirable.

U.S. Publication Application Number 2019/0367072 describes a system including an armrest structure. The system includes a steering wheel support arm supported by the armrest structure and movable between an extended position outside the armrest structure and a retracted position inside the armrest structure.

SUMMARY OF THE DISCLOSURE

In an aspect of the present disclosure, a steering wheel control system associated with a vehicle is provided. The steering wheel control system includes a steering wheel movable between a stowed position and a deployed position, wherein, in the deployed position, the steering wheel is centrally located relative to an operator of the machine. The steering wheel control system also includes a sensor assembly configured to generate a control signal pertaining to a position of the steering wheel. The steering wheel control system further includes a control module communicably coupled with the sensor assembly. The control module is configured to receive the control signal corresponding to the position of the steering wheel. The control module is also configured to control at least one operation of the vehicle based on receipt of the control signal from the sensor assembly.

In another aspect of the present disclosure, a method of controlling at least one operation of a vehicle is provided. The method includes positioning a steering wheel movable between a stowed position and a deployed position. In the deployed position, the steering wheel is centrally located relative to an operator of the machine. The method also includes generating, by a sensor assembly, a control signal pertaining to a position of the steering wheel. The method further includes receiving, by a control module, the control signal corresponding to the position of the steering wheel, the control module being communicably coupled with the sensor assembly. The method includes controlling, by the control module, the at least one operation of the vehicle based on receipt of the control signal from the sensor assembly.

Other features and aspects of this disclosure will be apparent from the following description and the accompanying drawings.

DETAILED DESCRIPTION

Figure 1:
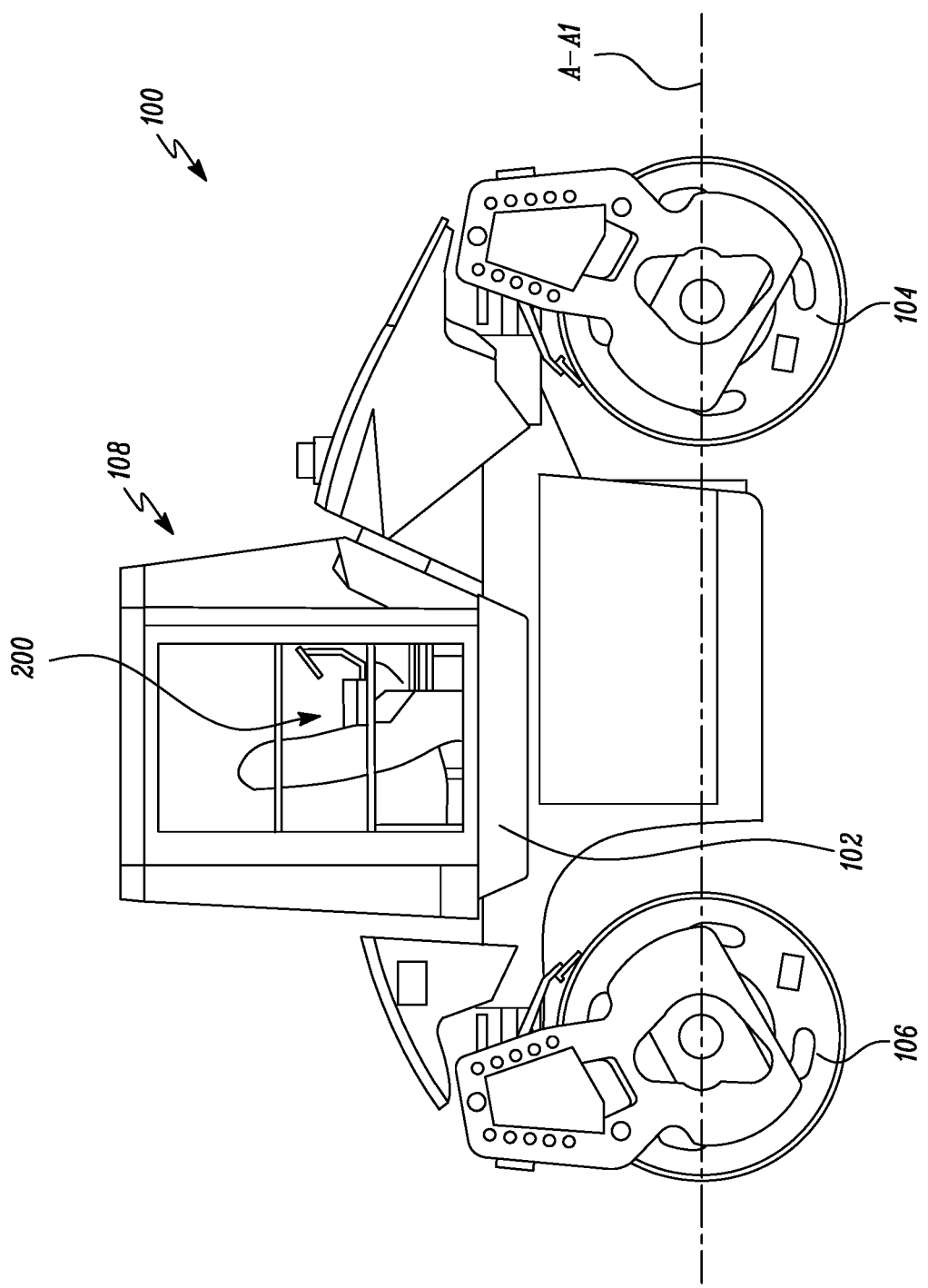
FIG. 1 is a side view of a vehicle, according to one embodiment of the present disclosure.

Wherever possible, the same reference numbers will be used throughout the drawings to refer to the same or like parts. Referring to FIG. 1, a side view of an exemplary vehicle 100 is illustrated. The vehicle 100 is embodied as a compactor, and more particularly an asphalt compactor. In other examples, the vehicle 100 may embody a soil compactor or another utility compactor. Accordingly, the vehicle 100 may move over a ground surface made of asphalt, gravel, and the like, in order to compact it. The vehicle 100 may include any other vehicle that provides compaction of the ground surface or roadway, without any limitations. Further, the vehicle 100 may include a wheel loader, rotary mixer, motor grader, excavator, and the like. The vehicle 100 may also include commercial or passenger vehicles, such as, cars, trucks, buses, vans, and the like.

The vehicle 100 defines a longitudinal axis "A-A1". The vehicle 100 includes a frame 102. The frame 102 supports various components of the vehicle 100 thereon. The vehicle 100 includes an enclosure (not shown) mounted on the frame 102. The enclosure encloses a power source (not shown) therein. The power source may be any power source, such as an internal combustion engine, batteries, motor, and so on. The power source provides power to the vehicle 100 for operational and mobility requirements.

Further, the frame 102 rotatably supports a first compactor drum 104 and a second compactor drum 106. The first and second compactor drums 104, 106 move on the ground surface for compaction of the ground surface. The first and second compactor drums 104, 106 are embodied as a set of ground engaging members that rotate about their respective axes thereby propelling the vehicle 100 on the ground surface. In other embodiments, it can be contemplated to replace the second compactor drum 106 with a pair of wheels such that the wheels propel the vehicle 100.

An operator cab 108 is mounted on the frame 102. When the vehicle 100 is embodied as a manual or semi-autonomous vehicle 100, an operator of the vehicle 100 is seated within the operator cab 108 to perform one or more vehicle functions. The operator cab 108 includes input devices to perform various functions associated with the vehicle 100.

For example, the operator cab 108 may include levers, knobs, buttons, and the like to activate/deactivate various vehicle functionalities. Further, the operator cab 108 includes a seating system 200 positioned therein. The seating system 200 allows the operator to sit and perform one or more functions related to the vehicle 100.

Figure 2:
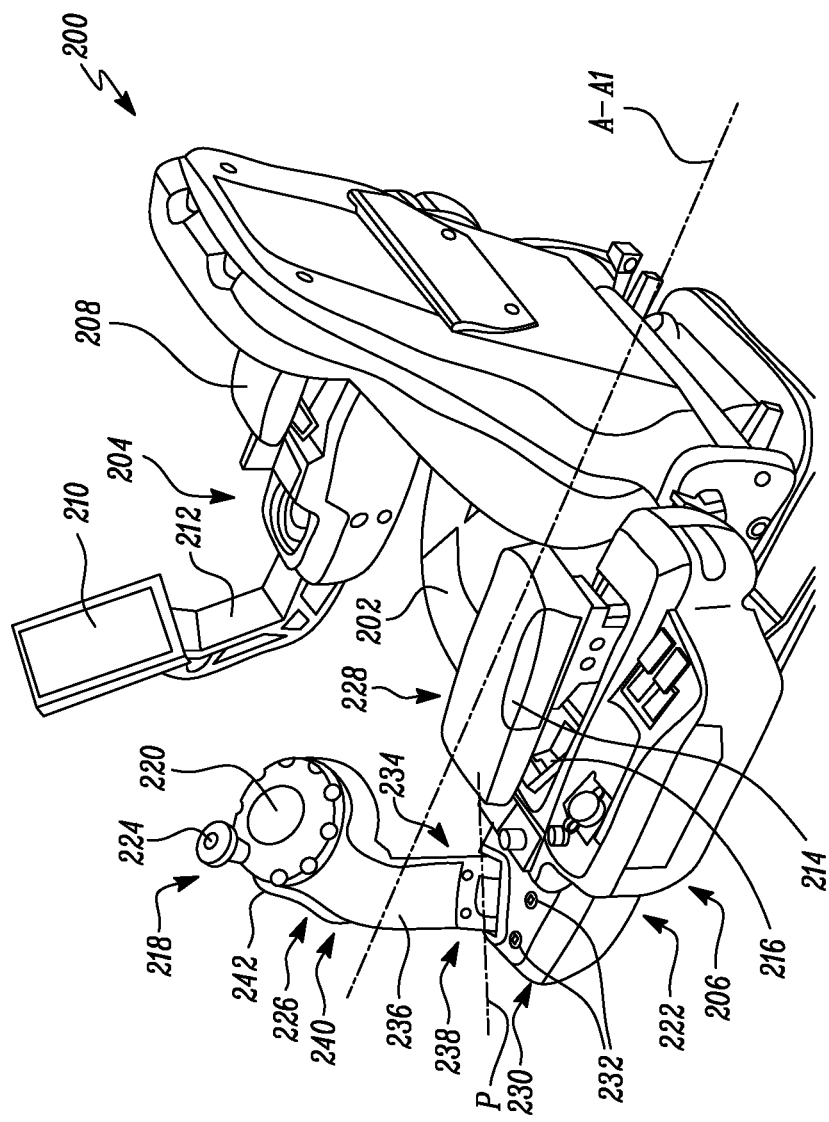
FIG. 2 is a perspective view of a seating system associated with the vehicle of FIG. 1.

As shown in FIG. 2, the seating system 200 includes a seat 202 for an operator to sit. Further, the seating system 200 include a first armrest structure 204 and a second armrest structure 206 spaced apart from the first armrest structure 204. The first armrest structure 204 include a first armrest support 208. In some examples, a user interface 210 is coupled to the first armrest structure 204 by a bracket assembly 212.

Further, the second armrest structure 206 includes a second armrest support 214. Moreover, the second armrest structure 206 includes an input device 216 that allows movement of the second armrest structure 206 along the longitudinal axis "A-A1" of the vehicle 100. The input device 216 is embodied as a lever herein. Further, a steering wheel control system 218 is associated with the vehicle 100. The steering wheel control system 218 may be hereinafter interchangeably referred to as "the control system 218".

The control system 218 includes a steering wheel 220 movable between a stowed position and a deployed position. The movement of the steering wheel 220 between the stowed position and the deployed position allows centering of the steering wheel 220 relative to the operator. Further, in the deployed position, the steering wheel 220 is centrally located relative to the operator of the machine 100. More particularly, in the deployed position, a distance of the steering wheel 220 from each of the first and second armrest structures 204, 206 may be approximately equal such that the steering wheel 220 lies front and central relative to the operator. The steering wheel 220 is positioned at a front end 222 of the seating system 200 in the deployed position. The steering wheel 220 is illustrated in the deployed position in FIG. 2 and the steering wheel 220 is illustrated in the stowed position in FIG. 3.

As shown in FIG. 2, the steering wheel 220 may be used to control a steering of the vehicle 100, via a steering system (not shown) of the vehicle 100. The steering wheel 220 includes a spinner 224 for the operator to hold while operating the steering wheel 220. The steering wheel 220 is coupled to a mounting assembly 226. The mounting assembly 226 is in turn coupled to a front portion 228 of the second armrest structure 206. The mounting assembly 226 is movable along the longitudinal axis "A-A1" of the vehicle 100 based on actuation of the input device 216. More particularly, the steering wheel 220 may be movable along the longitudinal axis "A-A1" based on adjustments made to the input device 216. Thus, the mounting assembly 226 may be disposed at different distances relative to the seat 202, as per requirements.

The mounting assembly 226 includes a first bracket 230 coupled to the seating system 200. The first bracket 230 is coupled with the second armrest structure 206 using a number of first mechanical fasteners 232. In the illustrated example, the first bracket 230 is coupled with the second armrest structure 206 using three first mechanical fasteners 232. The first mechanical fasteners 232 may embody a bolt, screw, pin, and the like. The first bracket 230 includes a hollow structure. Further, the mounting assembly 226 includes a second bracket 234. The second bracket 234 defines a first end 238 and a second end 240. The second bracket 234 is pivotally coupled to the first bracket 230 proximate to the first end 238. More particularly, the first bracket 230 is movably coupled with the frame member 236.

The second bracket 234 includes a frame member 236 and a cover 242 disposed proximate to the second end 240. The cover 242 is integrally coupled with the frame member 236. The cover 242 provides a protective covering for the steering wheel 220. The steering wheel 220 is coupled to the frame member 236 and the cover 242. In one example, the steering wheel 220 may be coupled to the frame member 236 and the cover 242 using mechanical fasteners (not shown) or by a press fit. The cover 242 may define a hollow space for housing various wires that connect the steering wheel 220 with the steering system and/or other components of the vehicle 100. Such wires may further pass through the frame member 236 and the first bracket 230 for connection of the wires with other components of the vehicle 100.

Figure 3:
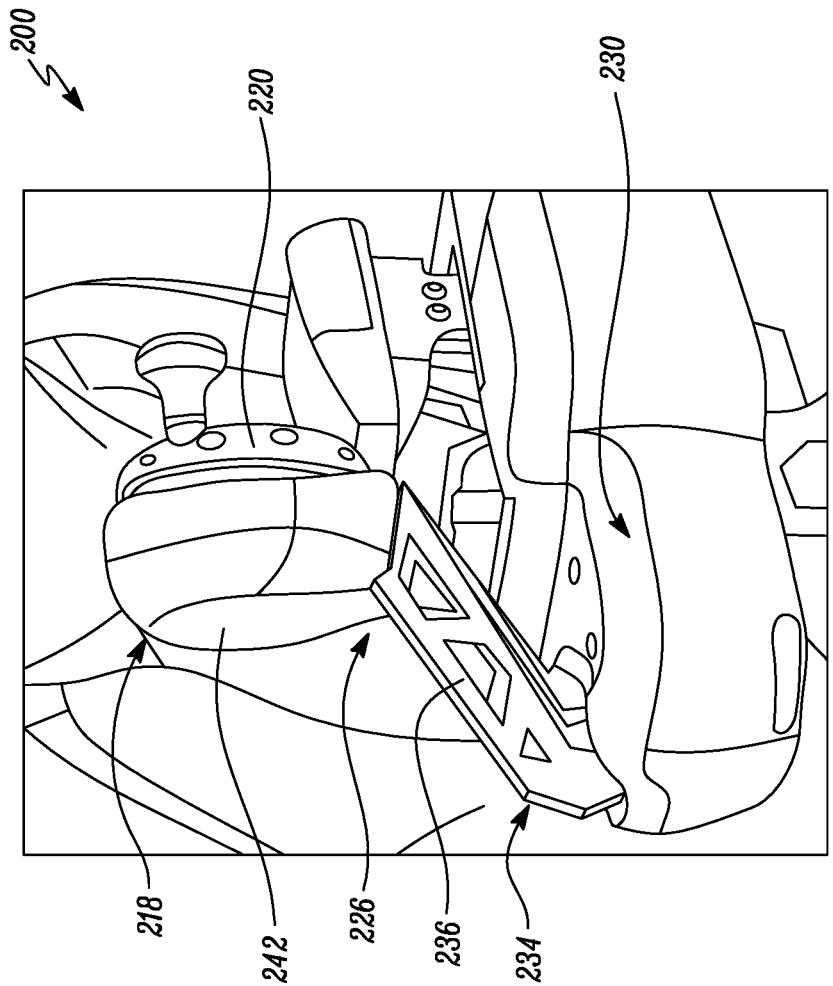
FIG. 3 illustrates a steering wheel associated with the seating system of FIG. 2 in a stowed position.

Further, the steering wheel 220 is movable between the stowed position and the deployed position based on a pivoting movement of the second bracket 234 relative to the first bracket 230. The second bracket 234 is pivotable about a pivot axis "P" relative to the first bracket 230. As illustrated in FIG. 3, the second bracket 234 moves towards the first bracket 230 for positioning the steering wheel 220 in the stowed position. Based on the pivoting movement of the second bracket 234 relative to the first bracket 230, the steering wheel 220 may be disposed at various angles relative to the first bracket 230. More particularly, the second bracket 234 may be pivoted along an angular range such that the second bracket 234 may be disposed at a desired angle, as per application requirements. In an example, the frame member 236 is disposed at an angle that is less than 90 Degrees when the steering wheel 220 in the stowed position. Further, the second bracket 234 moves away from the first bracket 230 for positioning the steering wheel 220 in the deployed position. In various examples, the frame member 236 is disposed at an angle that is more than 90 Degrees or approximately equal to 90 Degrees when the steering wheel 220 in the stowed position.

Figure 4:
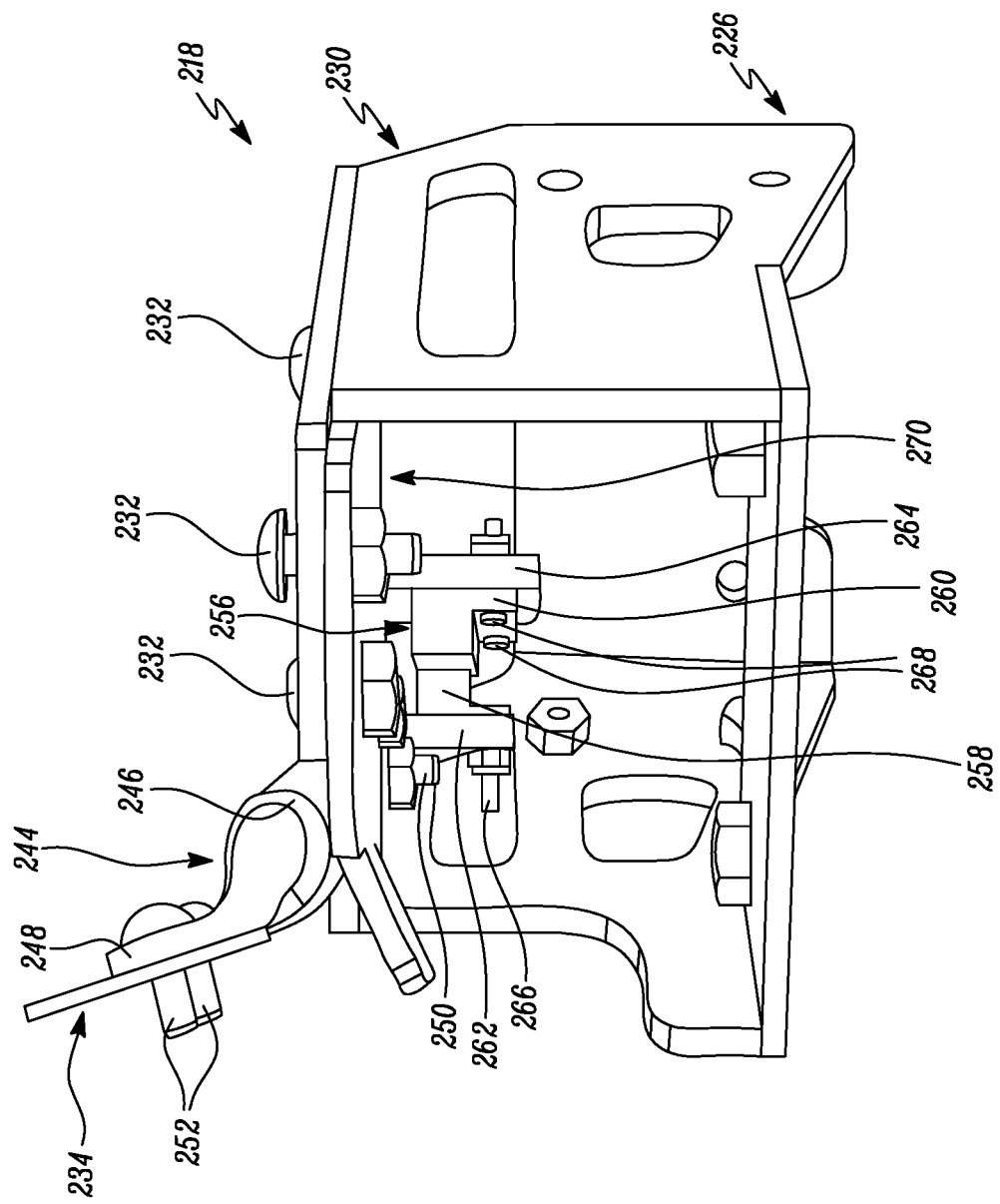
FIG. 4 illustrates a sensor assembly of a steering wheel control system associated with the vehicle of FIG. 1.

As shown in FIG. 4, a hinge assembly 244 couples the first bracket 230 to the second bracket 234 such that that the second bracket 234 may pivot relative to the first bracket 230. The hinge assembly 244 includes a fixed member 246 and a movable member 248 that is movable relative to the fixed member 246. The movable member 248 is received within the fixed member 246. The fixed member 246 is coupled with the first bracket 230 using a pair of second mechanical fasteners 250, only one of which is illustrated herein. Further, the movable member 248 is coupled to the frame member 236 of the second bracket 234 using a pair of third mechanical fasteners 252. The second and third mechanical fasteners 250, 252 may embody a bolt, screw, pin, and the like.

Further, the control system 218 includes a sensor assembly 256. The sensor assembly 256 generates a control signal pertaining to a position of the steering wheel 220. More particularly, the sensor assembly 256 generates the control signal corresponding to a current position of the steering wheel 220 to indicate if the steering wheel 220 is in the stowed position or the deployed position at any instance of time. The sensor assembly 256 provides a redundant signal to allow a fault detection capability.

The sensor assembly 256 is coupled with the first bracket 230. In the illustrated example, the sensor assembly 256 include two parts 258, 260 that are spaced apart from each other. The part 258 is a trigger component and the part 260 includes the sensing elements. The sensor assembly 256 is activated when the part 258 is in proximity with the part 260.

The parts 258, 260 are coupled with plate members 262, 264, respectively. The plate members 262, 264 are integral with the first bracket 230. Further, the parts 258, 260 are coupled with the plate members 262, 264 using a pair of fourth mechanical fasteners 266, 268, respectively. The fourth mechanical fasteners 266, 268 may embody a bolt, screw, pin, and the like. The plate members 262, 264 extend in a downward direction from an upper portion 270 of the first bracket 230. In an example, the sensor assembly 256 includes one or more proximity sensors. For example, the sensor assembly 256 may include a magnetic proximity sensor. Alternatively, the sensor assembly 256 may include another type of sensor that generates the control signal pertaining to the position of the steering wheel 220, without limiting the scope of the present disclosure.

Further, the sensor assembly 256 generates the control signal based on the pivoting movement of the second bracket 234 relative to the first bracket 230. In an example, when the steering wheel 220 moves to the stowed position, the part 258 moves away or is spaced apart from the part 260. Thus, the sensor assembly 256 generates the control signal for indicating the positioning of the steering wheel 220 in the stowed position. Further, when the steering wheel 220 moves to the deployed position, the part 258 moves towards the part 260 or is proximate to the part 260. Thus, the sensor assembly 256 generates the control signal for indicating the positioning of the steering wheel 220 in the deployed position.

Figure 5:
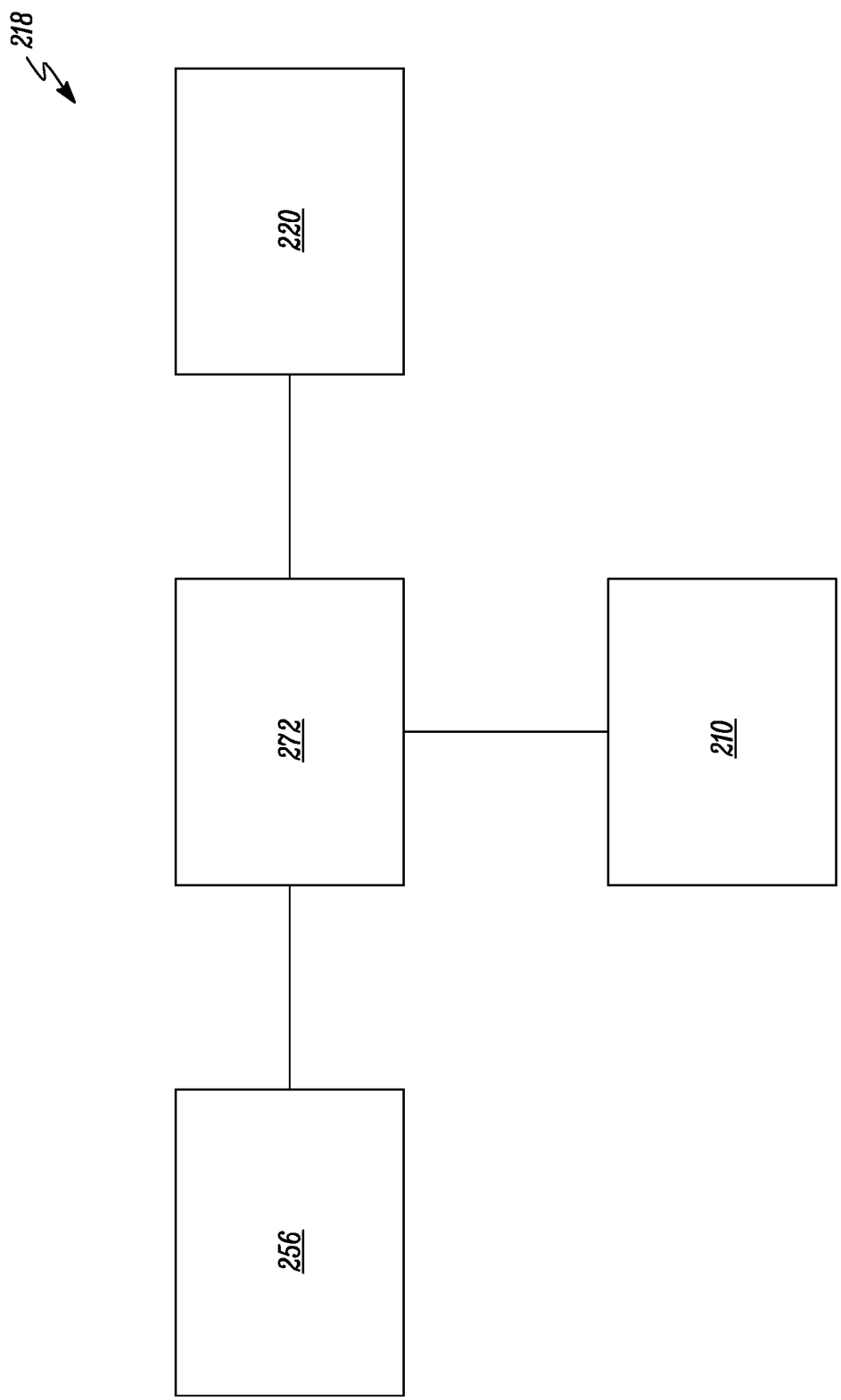
FIG. 5 is a block diagram of the steering wheel control system of FIG. 4.

Referring now to FIG. 5, the control system 218 includes a control module 272. The control module 272 is communicably coupled with the sensor assembly 256. Moreover, the control module 272 is communicably coupled with the steering wheel 220. The control module 272 receives the control signal corresponding to the position of the steering wheel 220. Further, the control module 272 control one or more operations of the vehicle 100 based on receipt of the control signal from the sensor assembly 256.

In one example, the one or more operations includes deactivating the steering wheel 220 when the steering wheel 220 is in the stowed position. More particularly, when the control module 272 detects the presence of the steering wheel 220 in the stowed position, the control module 272 sends a signal to the steering wheel 220 for deactivating or locking the steering wheel 220. The steering wheel 220 may be in a deactivated state until the steering wheel 220 is in the stowed position.

In another example, the one or more operations includes activating the steering wheel 220 when the steering wheel 220 is in the deployed position. More particularly, when the control module 272 detects the presence of the steering wheel 220 in the deployed position, the control module 272 sends a signal to the steering wheel 220 for switching the steering wheel 220 from the deactivated state to an activated state. Although the operations performed by the control module 272 relates to the switching of the steering wheel 220 between the deactivated and activated states, it may be contemplated to control any other operation of the vehicle 100 as per application requirements, without limiting the scope of the present disclosure.

In some examples, the control module 272 may be coupled to the user interface 210 (see FIG. 2). For example, the control module 272 may transmit a notification to the user interface 210 to notify the operator regarding the position of the steering wheel 220, i.e. if the steering wheel 220 is in the stowed position or the deployed position. In another example, the notification may notify the operator is the steering wheel 220 is in the deactivated state or the activated state.

The control module 272 may embody a separate control unit or functionalities of the control module 272 may be stored and executed by a central control unit associated with the vehicle 100, without any limitations. The control module 272 may embody a single microprocessor or multiple microprocessors for receiving signals from various components of the vehicle 100. Numerous commercially available microprocessors may be configured to perform the functions of the control module 272. It should be appreciated that the control module 272 may embody a vehicle microprocessor capable of controlling numerous vehicle functions. A person of ordinary skill in the art will appreciate that the control module 272 may additionally include other components and may also perform other functions not described herein.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 6:
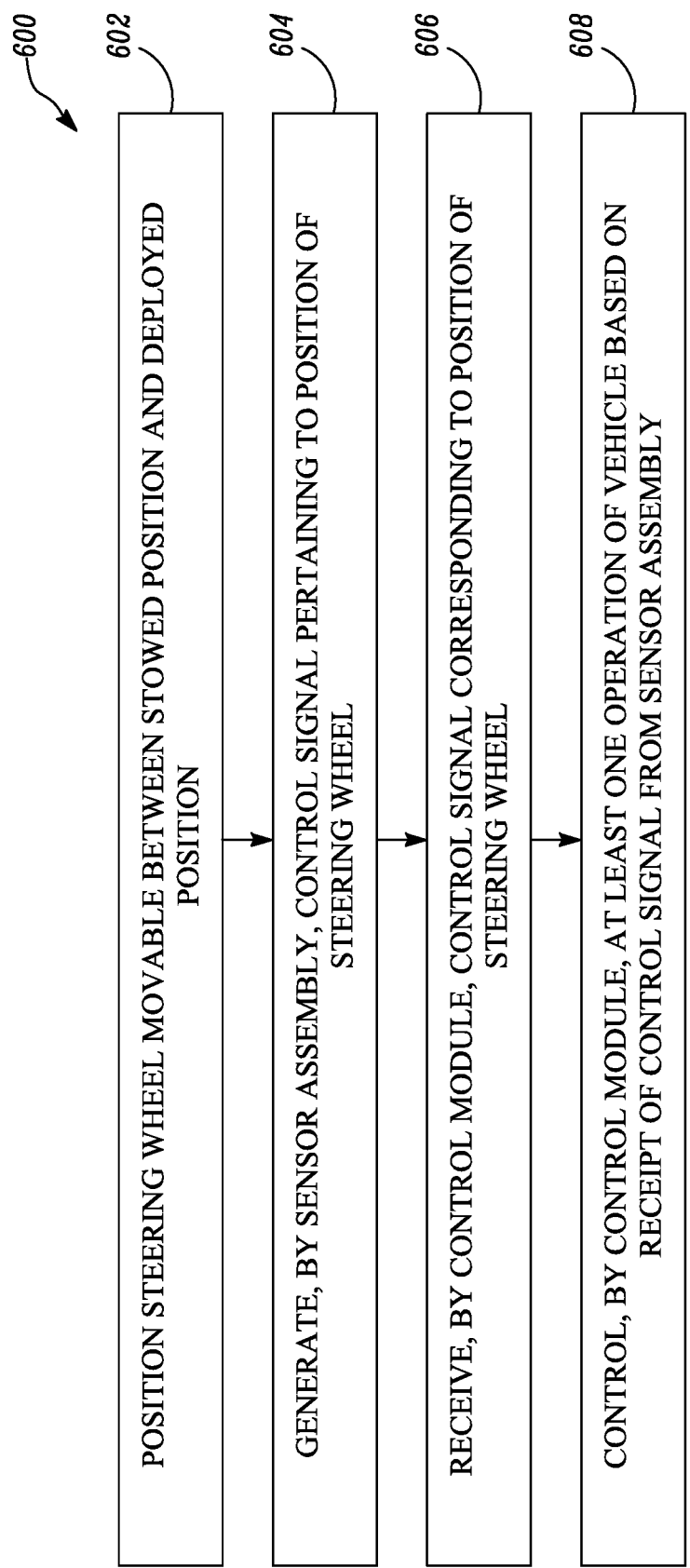
FIG. 6 is a flowchart for a method of controlling one or more operations of the vehicle.

FIG. 6 illustrates a flowchart for a method 600 of controlling one or more operations of the vehicle 100. At step 602, the steering wheel 220 movable between the stowed position and the deployed position is positioned. In the deployed position, the steering wheel 220 is centrally located relative to the operator of the machine 100. The steering wheel 220 is coupled with the mounting assembly 226 associated with the seating system 200. The steering wheel 220 is positioned at the front end 222 of the seating system 200 in the deployed position. The mounting assembly 226 includes the first bracket 230 and the second bracket 234 pivotally coupled to the first bracket 230. The steering wheel 220 is coupled with the second bracket 234. The steering wheel 220 is moved to the stowed position based on the pivoting movement of the second bracket 234 towards the first bracket 230. Further, the steering wheel 220 is moved to the deployed position based on the pivoting movement of the second bracket 234 away from the first bracket 230.

At step 604, the sensor assembly 256 generates the control signal pertaining to the position of the steering wheel 220. The sensor assembly 256 is coupled with the first bracket 230. In an example, the control signal is generated based on the pivoting movement of the second bracket 234 relative to the first bracket 230. In an example, one or more proximity sensors are coupled with the mounting assembly 226.

At step 606, the control module 272 receives the control signal corresponding to the position of the steering wheel 220. The control module 272 is communicably coupled with the sensor assembly 256. At step 608, the control module 272 controls the one or more operations of the vehicle 100 based on receipt of the control signal from the sensor assembly 256. In an example, the control module 272 is communicably coupled with the steering wheel 220 for controlling the one or more operations of the vehicle 100. Further, in an example, the one or more operations of the vehicle 100 includes deactivating the steering wheel 220 when the steering wheel 220 is in the stowed position.

The steering wheel control system 218 of the present disclosure can be associated with a variety of vehicles, including, but not limited to construction vehicles, commercial, or passenger vehicles. The control system 218 described herein provides a simple, effective, and cost-efficient solution for adjusting the position of the steering wheel 220 and also to deactivate/activate steering wheel 220 based on the position of the steering wheel 220. The control system 218 eliminates any possibility of inadvertent operation of the steering wheel 220 while the operator is moving in or out of the operator cab 108.

Further, the steering wheel 220 is coupled with the mounting assembly 226 that allows the steering wheel 220 to be easily switched between the stowed and deployed position. Thus, the steering wheel 220 is disposed front and center relative to the operator in the deployed position, and the steering wheel 220 may be pivoted out of the way to the stowed position, as required. Further, the movement of the steering wheel 220 does not cause any changes to a functionality or position of various devices present on the second armrest structure 206. More particularly, the movement of the steering wheel 220 between the deployed and stowed positions does not cause movement of any other components of the second armrest structure 206. Thus, the functionality of other controls on the second armrest structure 206 is retained.

Further, the operator of the vehicle 100 can easily pivot the steering wheel 220 to the stowed position when the operator needs to move in and out of the operator cab 108. Further, the steering wheel 220 can be oriented and disposed as per operator preferences. More particularly, the steering wheel 220 can be disposed at various angles relative to the first bracket 230 thereby allowing the operator to orient and position the steering wheel 220 as desired. Additionally, the entire mounting assembly 226 can be moved along the longitudinal axis "A-A1". The pivoting movement of the second bracket 234 and the movement of the mounting assembly 226 along the longitudinal axis "A-A1" provides improved drive comfort to the operator.

Further, the steering wheel 220 is disposed in front of the operator when the operator is seated on the seat 202. Moreover, the mounting assembly 226 and the steering wheel 220 may move with the operator cab 108 when the operator cab 108 is being adjusted, for example, during sliding or rotation of the operator cab 108. It should be noted that the control system 218 described herein may be easily retrofitted on an existing vehicle with limited software and hardware modifications, in turn, providing flexibility and compatibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A steering wheel control system for a vehicle, the steering wheel control system comprising:
    a steering wheel movable between a stowed position and a deployed position, wherein, in the deployed position, the steering wheel is centrally located relative to an operator of the vehicle;
    a sensor assembly configured to generate a control signal pertaining to a position of the steering wheel;
    a control module communicably coupled with the sensor assembly, wherein the control module is configured to:
        receive the control signal corresponding to the position of the steering wheel;
        control at least one operation of the vehicle based on receipt of the control signal from the sensor assembly;
    a mounting assembly, wherein the steering wheel is adapted to be coupled to the mounting assembly, the mounting assembly including:
        a first bracket coupled to a seating system; and
        a second bracket defining a first end and a second end, wherein the second bracket is pivotally coupled to the first bracket proximate to the first end, the steering wheel being adapted to be coupled to the second bracket;
    wherein the sensor assembly is coupled with the first bracket, and wherein the sensor assembly generates the control signal based exclusively on a pivoting movement of the second bracket relative to the first bracket;
    wherein the steering wheel control system notifies the operator regarding the position of the steering wheel.

2. The steering wheel control system of claim 1, wherein the control module is communicably coupled with the steering wheel.

3. The steering wheel control system of claim 2, wherein the at least one operation includes deactivating the steering wheel when the steering wheel is in the stowed position.

4. The steering wheel control system of claim 1, wherein the second bracket includes a frame member and a cover disposed proximate to the second end, the steering wheel being adapted to be coupled to the frame member and the cover.

5. The steering wheel control system of claim 1, wherein the steering wheel is positioned at a front end of the seating system in the deployed position.

6. The steering wheel control system of claim 1, wherein the mounting assembly is movable along a longitudinal axis of the vehicle based on actuation of an input device;
    wherein the mounting assembly is movably coupled to an armrest structure, the armrest structure including input devices to perform various functions associated with the vehicle.

7. The steering wheel control system of claim 1, wherein the second bracket is adapted to move towards the first bracket for positioning the steering wheel in the stowed position.

8. The steering wheel control system of claim 7, wherein the second bracket is adapted to move away from the first bracket for positioning the steering wheel in the deployed position.

9. The steering wheel control system of claim 1, wherein the sensor assembly includes at least one proximity sensor.

10. A method of controlling at least one operation of a vehicle, the method comprising:
    mounting a steering wheel on a mounting assembly associated with a seating system, the mounting assembly including a first bracket and a second bracket pivotally coupled to the first bracket;
    positioning the steering wheel movable between a stowed position and a deployed position, wherein, in the deployed position, the steering wheel is centrally located relative to an operator of the vehicle;
    coupling a sensor assembly with the first bracket, wherein the sensor assembly generates a control assembly based exclusively on a pivoting movement of the second bracket relative to the first bracket;

generating, by the sensor assembly, the control signal pertaining to a position of the steering wheel;

receiving, by a control module, the control signal corresponding to the position of the steering wheel, the control module being communicably coupled with the sensor assembly;

controlling, by the control module, the at least one operation of the vehicle based on receipt of the control signal from the sensor assembly; and transmitting a notification notifying the operator regarding the position of the steering wheel.

11. The method of claim 10, wherein the step of controlling the at least one operation of the vehicle further includes communicably coupling the control module with the steering wheel.

12. The method of claim 11, wherein the step of controlling the at least one operation of the vehicle further includes deactivating the steering wheel when the steering wheel is in the stowed position.

13. The method of claim 10 further comprising coupling at least one proximity sensor with the mounting assembly.

14. The method of claim 10 further comprising coupling the steering wheel with the second bracket.

15. The method of claim 10 further comprising moving the steering wheel to the stowed position based exclusively on a pivoting movement of the second bracket towards the first bracket.

16. The method of claim 15 further comprising moving the steering wheel to the deployed position based on a pivoting movement of the second bracket away from the first bracket.

17. The method of claim 10 further comprising positioning the steering wheel at a front end of the seating system in the deployed position.

* * * * *